J. SHINSKY & C. LANGLOTZ.
BARREL HEADING MACHINE.
APPLICATION FILED DEC. 24, 1909.

983,841.

Patented Feb. 7, 1911.
4 SHEETS—SHEET 1.

Witnesses:

Inventors:
John Shinsky
Charles Langlotz

J. SHINSKY & C. LANGLOTZ.
BARREL HEADING MACHINE.
APPLICATION FILED DEC. 24, 1909.
983,841.
Patented Feb. 7, 1911.
4 SHEETS—SHEET 2.
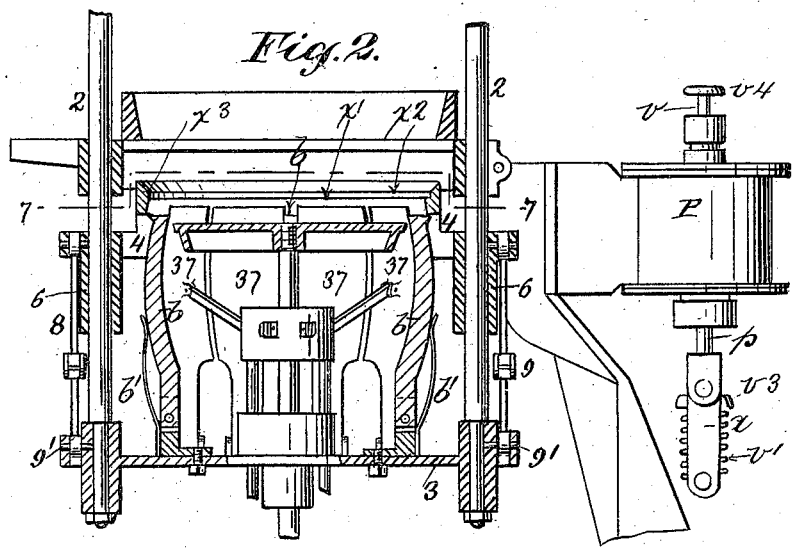
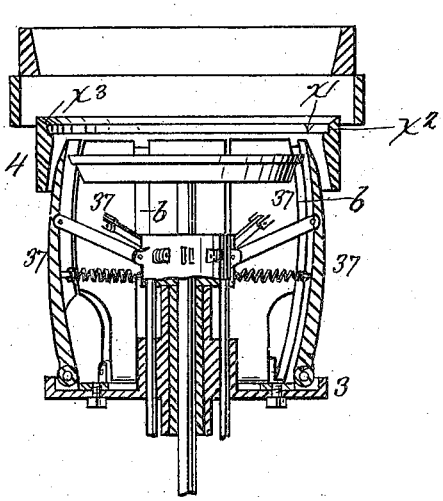
Witnesses:
Inventors:

J. SHINSKY & C. LANGLOTZ.
BARREL HEADING MACHINE.
APPLICATION FILED DEC. 24, 1909.

983,841.

Patented Feb. 7, 1911.

4 SHEETS—SHEET 3.

Witnesses:

Inventors:
John Shinsky
Charles Langlotz

J. SHINSKY & C. LANGLOTZ.
BARREL HEADING MACHINE.
APPLICATION FILED DEC. 24, 1909.
983,841.
Patented Feb. 7, 1911.
4 SHEETS—SHEET 4.
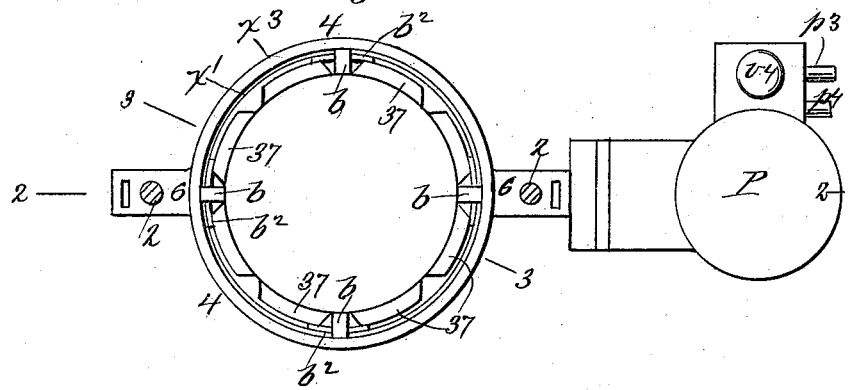
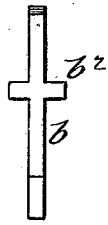
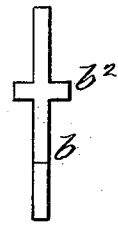
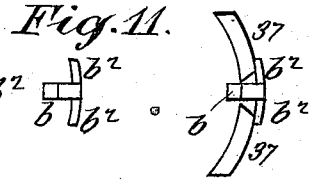
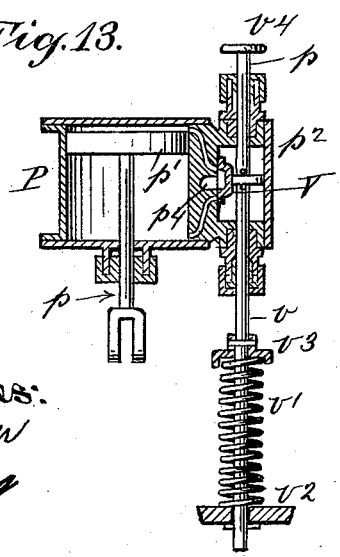
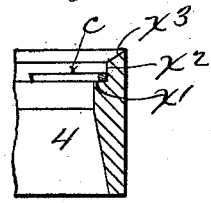
Witnesses:
D.W.Gardner
Inventors:
John Shinsky
Charles Langlotz
By their Attorney
Geo. W. Miatt
THE NORRIS PETERS CO., WASHINGTON, D. C.

UNITED STATES PATENT OFFICE.

JOHN SHINSKY AND CHARLES LANGLOTZ, OF NEW YORK, N. Y., ASSIGNORS TO BROOKLYN COOPERAGE COMPANY, OF BROOKLYN, NEW YORK.

BARREL-HEADING MACHINE.

983,841.

Specification of Letters Patent.

Patented Feb. 7, 1911.

Application filed December 24, 1909. Serial No. 534,805.

*To all whom it may concern:*

Be it known that we, JOHN SHINSKY and CHARLES LANGLOTZ, citizens of the United States, residing in the borough of Brooklyn, city of New York, county of Kings, and State of New York, have invented certain new and useful Improvements in Barrel-Heading Machines, of which the following is a specification.

Our improvements relate to the type of barrel heading machines set forth in Letters Patent No. 545,388 issued to John B. Standhope, August 27, 1895, in which provision is made for driving a wooden hoop to hold the staves after the head has been inserted.

The objects of our invention are to adapt the apparatus to the driving of wire hoops in lieu of the wooden hoops heretofore used; and to substitute elastic resilient pneumatic pressure for driving the hoop in lieu of the positive means heretofore used, thereby obviating the danger of breakage in case of any improper alinement of the staves or barrel head sections. It also includes the provision of means for supporting the barrel upon arms which are independent of the hoop support and stave spreaders, all substantially as hereinafter described and claimed specifically.

Figure 1:
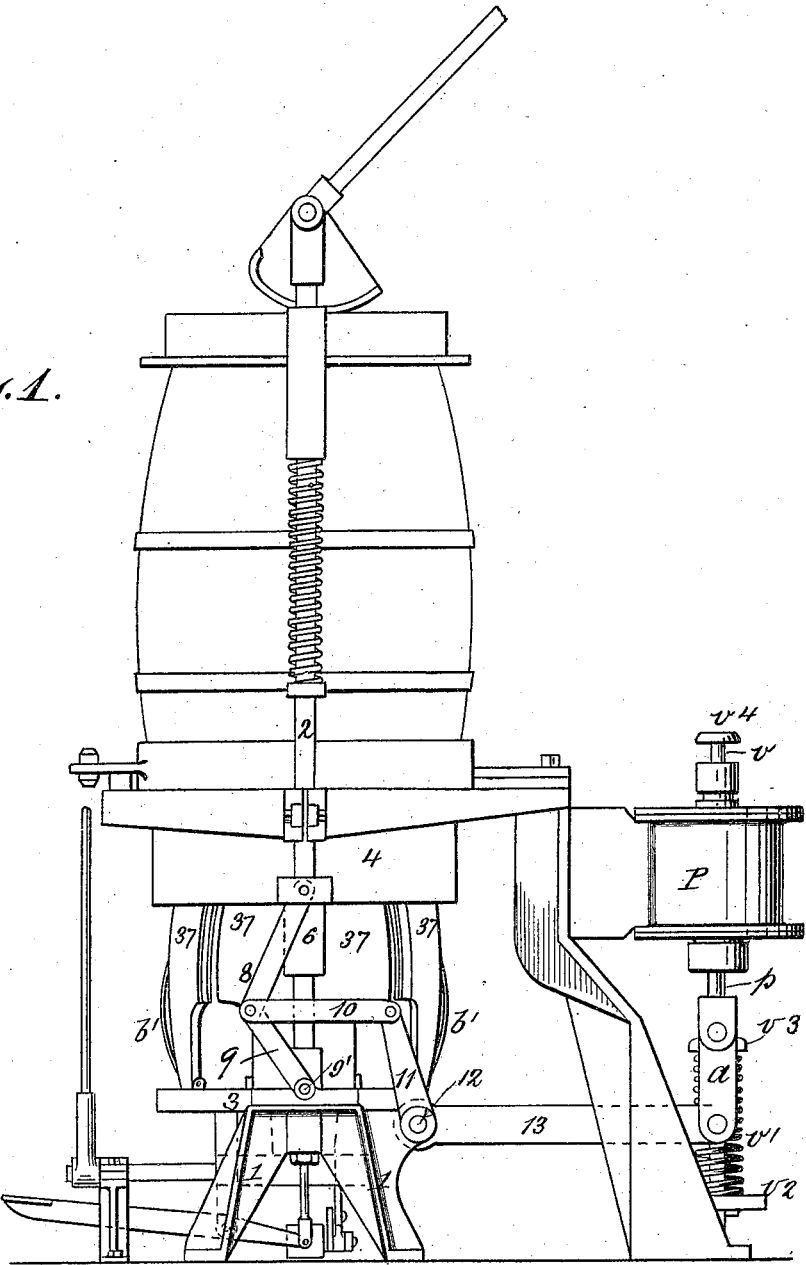
Figure 4:
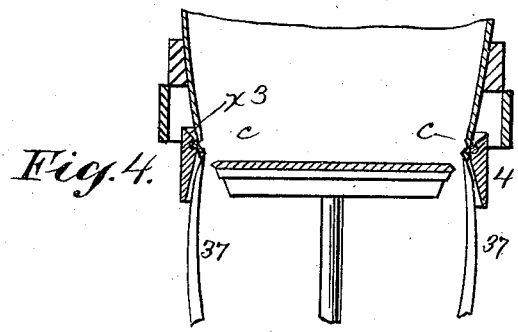
Figure 5:
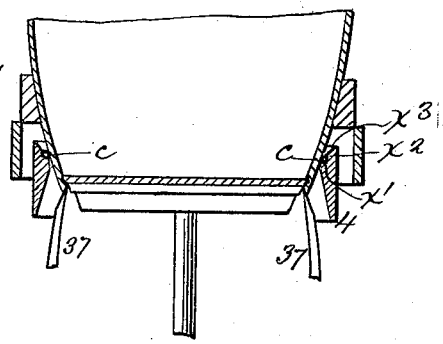
Figure 6:
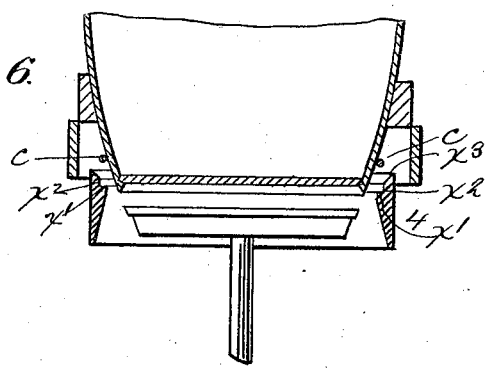

In the accompanying drawings, Figure 1, is a side view of a barrel heading machine embodying our invention; Fig. 2, is a sectional elevation of the lower portion of the apparatus upon plane of line 2—2—Fig. 7; Fig. 3, is a similar view taken upon plane of line 3—3—Fig. 7; Figs. 4, 5 and 6, are diagrammatic sectional views illustrating the operation of heading a barrel; Fig. 7, is a horizontal sectional elevation taken upon plane of line 7—7—Fig. 2; Figs. 8, 9, 10 and 11, are detail views of one of the independent barrel supporting arms; Fig. 12, is a detail view showing the relation of the barrel supporting arm and spreaders; Fig. 13, is a sectional elevation showing the pneumatic means for actuating the hoop driving mechanism; Fig. 14, is an enlarged sectional view of the upper portion of the hoop driving ring.

The operative parts are all mounted and supported upon a permanent base frame 1, rigidly secured to the floor. Projecting upward from the base 1, and on either side thereof are vertical rods 2, upon which are mounted the cross heads hereinafter referred to; said base frame 1, also supporting the bottom plate 3. In this connection it may be stated that in general construction and operation the apparatus is substantially the same as that disclosed in the Standhope patent hereinbefore referred to, to which reference may be had, so that it is unnecessary to enter herein into a description of all the details of construction and operation. In the present case the hoop spreaders of the Standhope patent, which were used to spread and centralize the old fashioned wooden hoop then in vogue are dispensed with, and a modern wire hoop $c$, is supported upon and between annular rectangular shoulders $x'$, $x^2$, formed on the upper portion of the lower cross head 4, which latter in the present case we designate as the hoop driving ring. The upper edge of the driving ring above the vertical shoulder $x^2$, is formed with the outward flare $x^3$, which facilitates both the insertion of the hoop $c$, and the end of the barrel.

The driving ring 4 is formed with bosses 6, embracing the rods 2, each boss being connected to the uppermost of a pair of toggle levers 8, 9, the lower lever of each pair being fulcrumed at 9', on a lug on the bottom plate 3. Each pair of toggle levers is connected by a link 10, to an arm 11, of the rock shaft 12, mounted in suitable brackets on the base frame 1. Attached to this rock shaft 12, is an operating arm or lever 13, extending outward in a substantially horizontal position, so that by moving this lever in one direction the toggle levers will be contracted and the cross head or driving ring 4, caused to descend, while by the movement of the latter in the opposite direction, the toggle levers will be expanded and the cross head 4, will be raised to drive the wire hoop $c$, onto the barrel.

One feature of our invention consists in operating the lever 13 by pneumatic pressure, so that in case of any irregularity in alinement of the staves or sections of the barrel head, the device will yield before undue resistance is encountered, thereby obviating all danger of breakage or fracture of the parts. In other words the operative pressure is not absolutely positive, but is resilient, so as to adapt itself to the degree of resistance encountered in driving a wire hoop upon the barrel. This result may obviously be accomplished by various forms of pneumatic apparatus, that shown in the drawings being however especially adapted for the purpose, in which case the lever 13, is pivotally connected by a link $a$, with the bifurcated end of the piston rod $p$, attached to the piston $p'$, in the cylinder P, which latter has the valve chest $p^2$, provided with the usual inlet $p^3$ and discharge $p^4$. The valve rod $v$, controlling the valve V, is held in its normal position by a spring $v'$, interposed between a stationary part $v^2$, and a collar $v^3$, on the rod $v$. In this position, shown in Fig. 13, the upper portion of the cylinder is in communication with the exhaust, and compressed air is admitted to the cylinder below the piston. When it is desired to drive a wire hoop onto the barrel, the valve rod $v$, is depressed by means of the tread $v^4$, against the resistance of the spring $v'$, thereby causing the valve V, to admit compressed air above the piston, while exhausting from below the same. The resilient pressure thus exerted upon the lever 13 through the medium of the link $a$, is sufficient to drive the wire hoop home under ordinary conditions, but should extraordinary resistance be encountered, the compressed air will obviously adapt itself automatically to such conditions. Upon the removal of the foot from the tread $v^4$, the spring $v'$, returns the valve to its normal position as above set forth.

The lower edge of the barrel is supported in the apparatus upon four independent equi-distant arms $b$, the lower ends of which are pivotally supported upon the bottom plate 3. Springs $b'$, are arranged to thrust these arms $b$, inward, so that the lateral lugs $b^2$, with which they are formed rest upon the segmental spreaders 37, the operation of which latter is fully described in the aforesaid Letters Patent. Hence the independent arms $b$, yield before the segments 37 while the latter are spreading the ends of the staves for the insertion of the barrel head, but continue to support the barrel during the whole operation of heading the barrel.

By our improvements in the construction of apparatus we not only obviate all danger of the breakage of staves or the buckling of the head sections, thereby economizing in material, but also we increase the capacity of the apparatus.

What we claim as our invention and desire to secure by Letters Patent is,

1. In a barrel heading machine, the combination with a ring having horizontal rectangular shoulders, of a bottom plate, equidistant arms pivotally mounted on said bottom plate and having lateral lugs, springs for thrusting said arms inward, and segmental spreaders with which said lugs coöperate.

2. In a barrel heading machine, the combination with a ring having horizontal rectangular shoulders, of a bottom plate, equidistant arms pivotally mounted on said bottom plate and having lateral lugs, springs for thrusting said arms inward, segmental spreaders with which said lugs coöperate, and means for actuation of said parts whereby said independent arms yield prior to the yielding of the segmental spreaders but supporting the barrel during the whole operation of heading.

3. In a barrel heading machine, the combination with a hoop forcing ring having horizontal annular shoulders and tapered end adjacent said shoulders, of a plurality of pivotally mounted independent barrel supporting arms, spreaders between which said arms are interposed, said arms having lateral lugs intermediate their ends, springs acting on said arms and means for operating said forcing ring.

4. In a barrel heading machine, the combination with a hoop forcing ring having horizontal annular shoulders and tapered end adjacent said shoulders, of a plurality of pivotally mounted independent barrel supporting arms, spreaders between which said arms are interposed, said posts having lateral lugs intermediate their ends, springs acting on said arms, means for operating said forcing ring, the forcing ring being formed with bosses, toggle levers connected to each boss, a rock shaft, a link connection between the same and said toggle levers, a lever extending substantially horizontally from said rock shaft, and means for actuating said lever.

JOHN SHINSKY.
CHARLES LANGLOTZ.

Witnesses:
Thos. A. Sullivan,
D. W. Gardner.